United States Patent [19]

Schetter

[11] 4,296,642
[45] Oct. 27, 1981

[54] TRANSMISSION INTERLOCK
[75] Inventor: Thomas C. Schetter, Toledo, Ohio
[73] Assignee: Dana Corporation, Toledo, Ohio
[21] Appl. No.: 67,932
[22] Filed: Aug. 20, 1979
[51] Int. Cl.³ .................. B60K 20/00; F16H 57/06; G05G 5/10; F16H 3/02
[52] U.S. Cl. .................................. 74/475; 74/476; 74/477; 74/745
[58] Field of Search .................. 74/475, 476, 477, 745

[56] References Cited

U.S. PATENT DOCUMENTS

| | | | |
|---|---|---|---|
| 1,079,961 | 12/1913 | Utz | 74/343 |
| 1,537,828 | 5/1925 | Jones | 74/476 X |
| 1,791,137 | 2/1931 | Manville | 74/477 |
| 1,877,540 | 9/1932 | Thompson | 74/476 |
| 2,017,101 | 10/1935 | Lapsley | 74/476 X |
| 2,118,090 | 5/1938 | Kurti et al. | 74/475 |
| 2,135,042 | 11/1938 | Rossman | 74/473 |
| 2,136,721 | 11/1938 | Maurer | 74/328 |
| 2,512,036 | 6/1950 | Orr | 74/477 X |
| 2,637,221 | 5/1953 | Backus et al. | 74/745 |
| 2,920,504 | 1/1960 | Sommer | 74/475 |
| 3,106,851 | 10/1963 | Ivanchich | 74/477 X |
| 3,192,788 | 7/1965 | Fodrea | 74/475 X |
| 3,229,551 | 1/1966 | Stuckey | 74/745 |
| 3,292,451 | 12/1966 | Jackin et al. | 74/475 X |
| 3,301,078 | 1/1967 | Michael | 74/477 X |
| 3,354,741 | 11/1967 | Johnston, Jr. et al. | 74/477 |
| 3,387,501 | 6/1968 | Frost | 74/477 X |
| 3,866,488 | 2/1975 | Nakata et al. | 74/477 X |
| 3,987,879 | 10/1976 | Longshore et al. | 74/477 X |
| 4,060,005 | 11/1977 | Bost | 74/477 X |
| 4,120,212 | 10/1978 | Philipsen | 74/477 |

FOREIGN PATENT DOCUMENTS 170499 10/1921 United Kingdom .................. 74/477

Primary Examiner—Leslie Braun
Attorney, Agent, or Firm—Wilson, Fraser, Barker & Clemens

[57] ABSTRACT

A transmission interlock for use in a motor vehicle transmission having at least two gear ratio selection means in tandem within a common housing. The transmission interlock includes an auxiliary shift rail parallel to and spaced from two operative shift rails which it interlocks. The auxiliary shift rail is linked to one of the two shift rails and translates positively therewith. An interlock member transversely disposed between the auxiliary shift rail and the second of the two shift rails interacts with slots or blind apertures in the shift rails to prevent selection of certain combinations of shift rail positions corresponding to prohibited gear ratio combinations.

13 Claims, 6 Drawing Figures

TRANSMISSION INTERLOCK

BACKGROUND OF THE INVENTION

The invention relates generally to transmission interlocks and more specifically to motor vehicle transmission interlocks which mechanically inhibit selection of certain gear ratio combinations.

Motor vehicle transmissions, especially those intended for use in trucks and tractors, often comprise plural multiple gear ratio selecting devices mechanically connected in tandem. For example, a five forward speed conventional transmission may be combined with an auxiliary two speed device utilized to drive the transmission countershaft. The resulting combination will provide ten forward speeds or gear ratios. The increased range of gear ratios provided by what is, in effect, a transmission having seven gear ratios is apparent. Less apparent but of equally great importance are the weight and space savings such a design exhibits over a conventional (non-tandem) transmission having for example ten independent and distinct gears and gear ratios.

In such a tandem transmission power train, it is frequently necessary to prevent operation of the transmission in a given combination of gear ratios due to intrinsic design or extrinsic application considerations. It thus may be necessary to positively prelude shifting such a transmission into certain combinations of gear ratios. For example, in a transmission having five forward gear ratios supplemented by a high/low range selection feature, it may be desirable to prevent simultaneous engagement of the fifth gear of the primary transmission and the high range of the auxiliary gear ratio selection device. Any means which will prohibit such a given selection must, of course, not effect the selection of any other gear ratio combination.

Interlock mechanisms which perform this function are known in the art. One such prior art mechanism employs a pneumatic logic system and actuator which inhibits a given attempted shift when a certain set of conditions exists. Since such systems are positioned externally of the transmission, they are subject to tampering by unauthorized personnel. These interlocks tend to be complex and their exposure to the hazards, both physical and chemical, of extended highway service may appreciably shorten their life.

SUMMARY OF THE INVENTION

The invention comprehends a novel interlock mechanism which may be totally enclosed within the housing of a transmission having multiple gear ratio selecting means in tandem. Generally speaking, such a transmission will define a main or primary transmission having several forward and at least one reverse gear ratio in tandem with an auxiliary or supplemental transmission having a least two gear ratios. The main transmission may have a plurality of gears freely rotatably and coaxially disposed about an output shaft. The gears are simultaneously driven by complementarily configured gears secured to parallel countershafts and a selected gear ratio is engaged by locking the selected gear to the output shaft by means of an axially sliding clutch collar. The clutch collars are connected through fork members to a bank of parallel shift rails generally disposed in a horizontal plane near the upper portion of the transmission housing. The supplemental or auxiliary transmission may include a similar gear ratio selection means which provides at least two selectable gear ratios between the input shaft and the countershaft. Generally, this gear selection may also be accomplished by means of a sliding clutch collar, fork member and shift rail. The main transmission shift rails are generally manually operated directly by the vehicle operator whereas the supplemental transmission shift rail is frequently pneumatically or hydraulically driven. This pneumatically driven shift rail may be disposed at a substantial center to center distance from the main transmission shift rails.

The invention comprehends the addition of a slave or auxiliary shift rail disposed parallel to and generally intermediate the main and supplemental shift rails which is linked to one of said shift rails. So positioned and connected, the auxiliary rail duplicates the axial motion of the shift rail to which it is linked. A lockout pin is positioned for transverse motion between the auxiliary shift rail and the one of the main or supplemental shift rails to which the auxiliary rail is not linked. Adjacent the points of intersection of the axes of the lockout pin and the rails are blind openings or slots which receive or interfere with the lockout pin depending upon the relative axial position of the main and auxiliary gear shift rails. The reception or interference of the lockout pin in a shift rail will permit or inhibit an attempted shift and allow or preclude operation of the transmission in a certain combination or combinations of gear ratios.

Thus it is the object of the invention to provide a transmission shift interlock which positively precludes the selection of certain combinations of gear ratios.

It is a further object of the instant invention to provide a gear shift interlock which is mounted entirely within the transmission housing.

It is a still further object of the instant invention to provide a gear shift interlock which is not susceptible to tampering and circumvention.

Further objects and advantages of the instant invention will become apparent by reference to the following specification and appended drawings.

DESCRIPTION OF THE PREFERRED EMBODIMENT

Figures 1, 2:
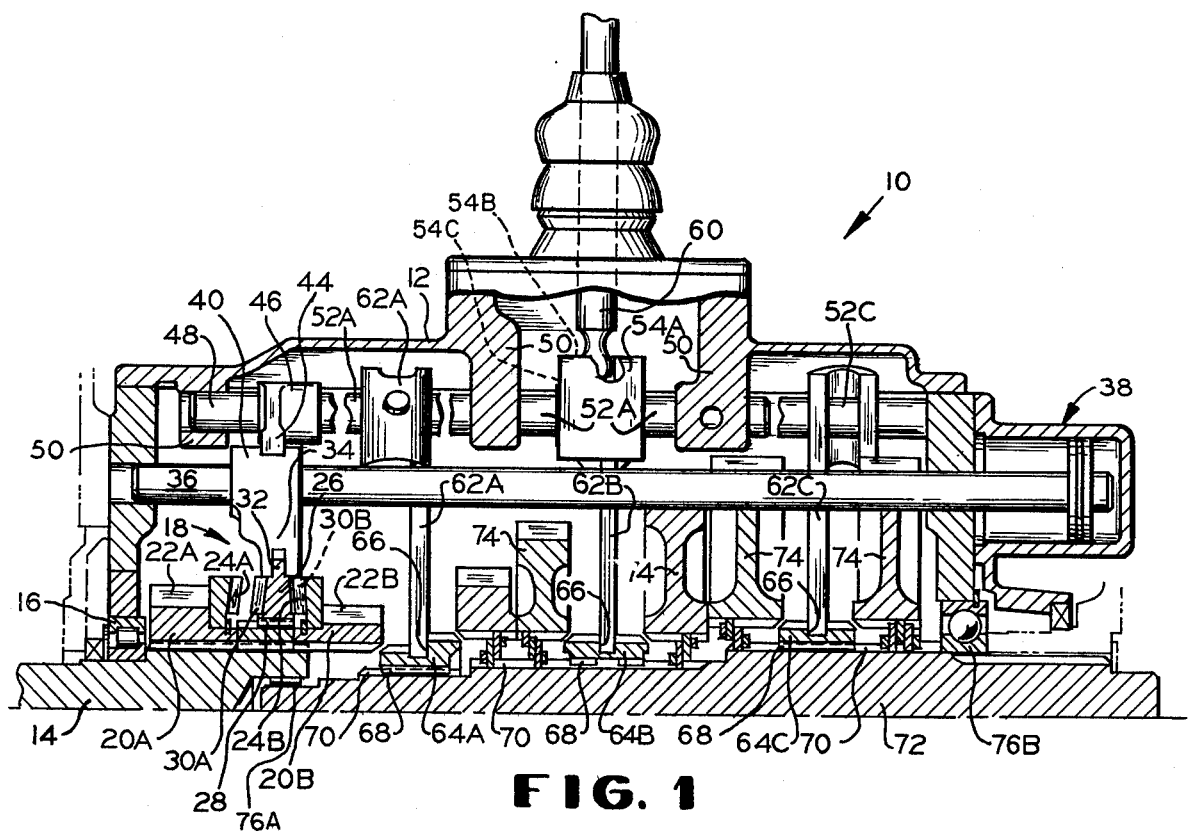
FIG. 1 is a fragmentary sectional view of a multi-speed transmission incorporating the instant invention.
FIG. 2 is an enlarged, side elevational view in partial section of an interlock mechanism according to the instant invention.

A transmission incorporating an interlock according to the instant invention is generally designated by the reference numeral 10. The transmission 10 includes a housing 12 which may be fabricated of cast material such as iron or aluminum. The housing 12 will typically include numerous openings and support structures which retain and position various components of the transmission 10. Among these components is an input shaft 14 which is rotatably positioned in suitable bearings 16, preferably anti-friction bearings. The input shaft 14 is operably linked to the output of a clutch assembly (not illustrated) which receives power from a prime mover (not illustrated), generally an internal combustion engine.

As stated previously, a transmission assembly incorporating the instant invention will include at least two gear ratio selecting devices in tandem. Typically, one of the two gear ratio devices will include at least two alternately engageable gear drive ratios between the input shaft and countershaft. Thus, the transmission 10 includes a single countershaft or dual countershafts (not illustrated) which are driven by a countershaft drive assembly 18 having at least two alternately engageable gear ratios. The countershaft drive assembly 18 includes a pair of freely rotatable gears 20A and 20B having a disparate number of gear teeth 22A and 22B which are in constant mesh with a complementary pair of gears fixedly disposed on the countershaft or countershafts. The gears 20A and 20B also include opposed and spaced apart face coupling teeth 24A and 24B. The face coupling gear teeth 24A and 24B may define any appropriate profile, for example, that disclosed in U.S. Pat. No. 2,464,913, issued Mar. 22, 1949. Positioned intermediate the opposed face coupling teeth 24A and 24B is a clutch collar 26 which is coaxially disposed about the input shaft 14 and includes an interconnecting spline means 28. The spline means 28 permit relative axial motion between the collar 26 and the input shaft 14 while inhibiting relative rotation therebetween. The clutch collar 26 further includes back-to-back sets of face coupling teeth 30A and 30B which may be selectively engaged with the face coupling teeth 24A and 24B, respectively. The clutch collar 26 also includes a tab or projection 32 disposed about its periphery. The projection 32 is engaged by a suitable shift fork 34 which is fixedly secured to an air shift rail 36. The shift rail 36 is disposed generally parallel to the axis of the input shaft 14 and is slidably positioned within suitable openings in the transmission housing 12. The shift rail 36 is driven between a first and a second position by an actuator assembly 38. The actuator assembly 38 may include an air driven two position piston disposed within a cylinder, or an electric or hydraulic two position actuator. Alternatively, the actuator assembly 38 may be mechanically linked to and driven by an auxiliary shift control (not illustrated) operated by the driver of the vehicle.

Operation of the countershaft drive assembly 18 is conventional. That is, when the actuator assembly 38, the shift rail 36, a shift fork 34, and the clutch collar 26 are in the first position, such as is illustrated in FIG. 1, a first gear ratio, that provided by the gear 20B is operative and transfers power from the input shaft 14 to the countershaft or countershafts. When the above delineated components are in the second position, to the left of that illustrated in FIG. 1, the face coupling teeth 24A and 30A are engaged and the gear ratio between the input shaft 14 and the countershaft or shafts is that provided by the gear 20A and its mate.

The shift fork 34 includes a collar 40 which defines a re-entrant portion or notch 42 disposed generally normal to but spaced from the axis of the air shift rail 36. The notch 42 accepts a generally complementarily configured arm-like member 44 which extends from a collar 46. The configuration and arrangement of the notch 42 and the arm-like member 44 should not be construed to be limiting of the invention. Rather, notch 42 may be positioned on the collar 46 and the arm-like member 44 may be an extension of the shift fork 34 and the collar 40. In fact, any inter-connection which provides positive axial simultaneous translation of the two shafts and which preferably, though not necessarily, may be easily disconnected for service, may be utilized to practice the instant invention. The collar 46 is secured to an auxiliary shift rail 48 which is maintained generally parallel to and spaced from the air shift rail 36 by means of appropriately positioned support structures 50 which form a portion of the transmission housing 12.

Figure 3:
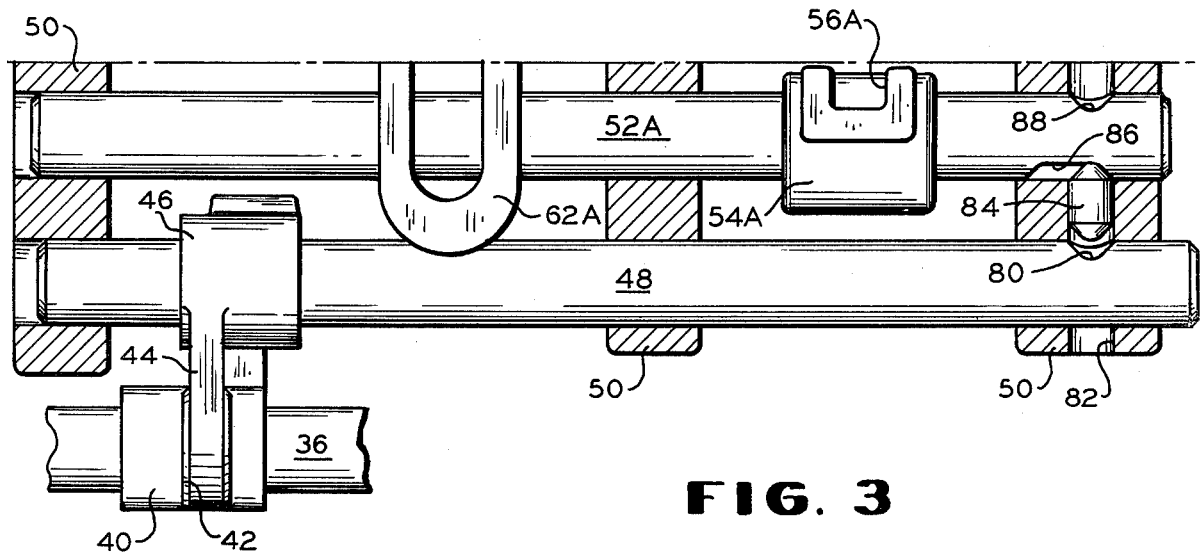
FIG. 3 is a fragmentary sectional view of an interlock mechanism according to the instant invention taken along line 3—3 of FIG. 2.
Figure 4:
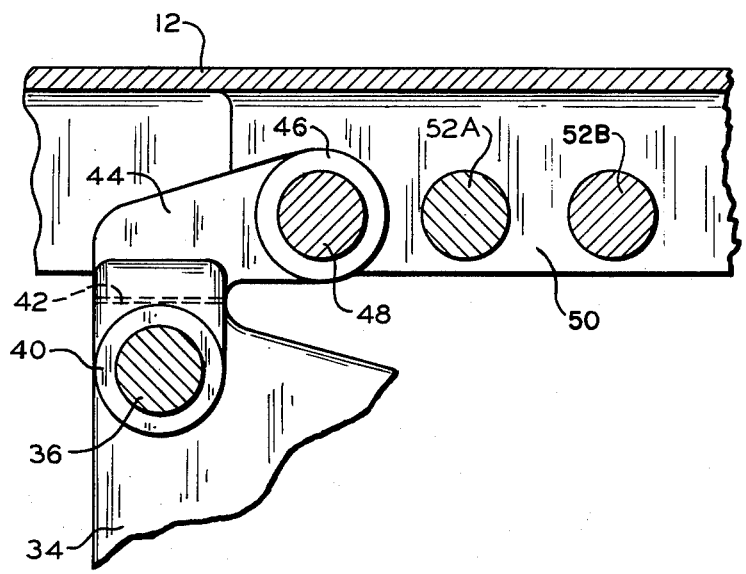
FIG. 4 is a fragmentary sectional view of an interlock mechanism according to the instant invention taken along line 4—4 of FIG. 2.

Referring now to FIGS. 1, 3 and 4, the support structures 50 also position a plurality of parallel, spaced apart shift rails 52A, 52B and 52C. Commonly, the parallel spaced apart rails 52B and 52C will be disposed behind the shift rail 52A in a horizontal plane coincidence therewith, as illustrated in FIG. 1. Generally speaking, the shift rails 52A, 52B, and 52C are utilized to select a pair of gear ratios, one gear ratio being selected by sliding the rail axially to a forward position and the second gear ratio being selected by sliding the rail axially to a rearward position. A third, intermediate position engages neither gear ratio and provides neutral. Disposed between the two central transmission supports 50 and secured to one of each of the rails 52A, 52B and 52C are a like plurality of shift yokes 54A, 54B (not visible) and 54C (not visible). The shift yokes 54A, 54B and 54C are aligned in a vertical plane oriented generally transversely to the axes of the shift rails 52A, 52B and 52C. Thus, in FIG. 1 only shift yoke 54A is visible, the other shift yokes being aligned therebehind. Likewise, in FIG. 3 only the shift yoke 54A, associated with the shift rail 52A, is illustrated. The shift yoke 54A defines a U-shaped shift lever socket 56A within which a conventional shift lever 60 may be selectively positioned to translate the shift rail 52A axially. The other shift rail sockets (not illustrated) defined by the other shift yokes 54B and 54C are appropriately configured to allow transverse passage of the shift lever 60 therethrough, in the case of the middle shift rail 52B, and to provide a transverse travel limit for the shift lever 60 in the case of the socket associated with the shift rail 52C. In accordance with conventional practice and operation, the shift lever 60 may be moved left, right, forward or rearward to engage and translate a selected shift rail 52A, 52B or 52C correspondingly.

Secured to each of the shift rails 52A, 52B and 52C is a shift fork 62A, 62B and 62C, respectively, which transfers the sliding axial motion of the associated shift rail 52A, 52B and 52C to an associated clutch collar 64A, 64B and 64C, respectively. According to conventional practice, the clutch collars 64A, 64B and 64C each define a centrally disposed annular groove 66 which is engaged by the shift forks 62A, 62B and 62C, respectively. According to conventional practice, the clutch collars 64A, 64B and 64C include splines 68 disposed on the inner surfaces of the clutch collars 64A, 64B and 64C which engage a complementary spline 70 on the external surface of an output shaft 72. The splines 68 and 70 allow relative axial motion between the output shaft 72 and the clutch collars 64A, 64B and 64C while inhibiting relative rotation therebetween. Lastly, the transmission includes a plurality of gears 74 disposed coaxially along the axis of the output shaft 72 and mounted for free rotation relative thereto. The gears 74 are engaged to and drive complementarily sized gears or pairs of gears (not illustrated) secured to the countershaft or countershafts. Preferably, the output shaft 72 is supported within the transmission 10 by suitable antifriction bearings 76 which, at the forward portion of the transmission 10 may take the form of needle bearings 76A concentrically disposed between the input shaft 14 and the output shaft 72 and at the rear portion of the transmission 10, may include a ball bearing race 76B disposed between the output shaft 72 and and the housing 12.

The operation of the transmission componentry, exclusive of the interlock mechanism, is conventional. According to conventional practice, the shift lever 60 is positioned to the left or right to select an appropriate shift rail of the three shift rails 52A, 52B and 52C and further positioned to the front or rear to correspondingly translate one of the shift rails 52A, 52B or 52C, its associated shift fork 62A, 62B and 62C and clutch collar 64A, 64B and 64C into engagement between one of the selected plurality of gears 74 and the output shaft 72, thereby positively driving the output shaft 72 through the selected gear ratio represented by the selected gear 74. It should be apparent that in addition to the gear ratio drives selected by the just described components of the transmission 10, the countershaft drive assembly 18 may also be utilized to independently select a high or low countershaft drive ratio. The effective gear ratio of the transmission 10 from the input shaft 14 to the output shaft 72 is thus the product of the gear ratio selected by the main transmission and the countershaft drive assembly 18.

Referring now to FIG. 3, the auxiliary shift rail 48 defines a re-entrant portion or seat 80. Although it is apparent that the seat 80 extends only over a limited circumferential segment of the auxiliary rail 48, it should be appreciated that an annular groove extending partially or completely about the circumference of the auxiliary rail 48 may also be utilized to practice the instant invention. Disposed within the support structure 50 and generally aligned with the seat 80 is a passageway 82 which extends at least between the auxiliary shift rail 48 and the shift rail 52A. Positioned within the passageway 82, between the auxiliary shift rail 48 and the shift rail 52A is locking pin 84. The locking pin 84 is free to translate along the axis of the passageway 82. The shift rail 52A includes a longitudinal re-entrant region or channel 86 having a length which generally corresponds to the travel of the shift rail 52A between neutral and one engaged gear.

The depth of the the seat 80 and the channel 86 is related to the overall length of the locking pin 84 and the distance between the auxiliary shift rail 48 and the shift rail 52A. Generally speaking, given equal depths of the seat 80 and the channel 86, the overall length of the locking pin 84 should be equal to slightly less than the distance between the auxiliary shift rail 48 and the shift rail 52A plus the depth of either the seat 80 or the slot 86. The shift rail 52A may also include other re-entrant seats 88 which cooperate with other interlock means associated with the other shift rails 52B and 52C.

Figure 5:
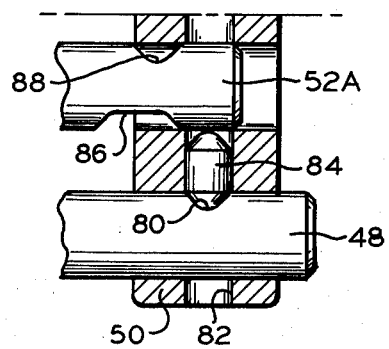
FIG. 5 is a fragmentary sectional view of an interlock mechanism according to the instant invention taken along line 3—3 of FIG. 2, showing the auxiliary shift rail locked in low range.
Figure 6:
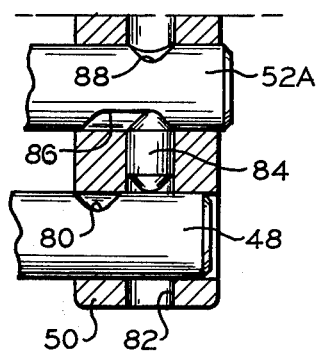
FIG. 6 is a fragmentary sectional view of an interlock mechanism according to the instant invention taken along line 3—3 of FIG. 2, showing the associated main shift rail limited to either neutral or its higher gear ratio selection position.

Operation of the interlock mechanism is illustrated in FIGS. 3, 5 and 6. As previously stated, the purpose of the interlock is to prevent selection and engagement of a given combination or combinations of gear ratios in the transmission having tandem, independently selectable gear ratio and power transmission means. In FIG. 3, the auxiliary shift rail 48 is illustrated in the low range position which corresponds to that position of the auxiliary shift rail 48 and air shift rail 36 illustrated in FIG. 1 wherein face coupling teeth 24B associated with the gear 20B are engaged by the clutch collar 26, thereby transferring power to the countershaft or countershafts through the lower of the two selectable gear ratios provided by the countershaft drive assembly 18. In this position, the auxiliary shift rail 48 and specifically the seat 80 allows the locking pin 84 to translate thereinto. Thus, the shift rail 52A may either travel to the rear (right) to select a given gear, in which case the length of the slot 86 would permit such a shift without moving the locking pin 84, or to the front (left) in which case the locking pin 84 would move to the position illustrated in FIG. 5.

With reference now to FIG. 5, the air shift rail 36 and the interconnected auxiliary shift rail 48 are illustrated in the rightmost or rearward, low range position. Now, however, the leftmost or forward position of the shift rail 52A has been selected. Reference to FIG. 1, specifically the location of the shift fork 62A associated with the shift rail 52A, reveals that direct drive from the gear 20B to the output shaft 72 is achieved by moving the clutch collar 64A to its forward (leftmost) position. In this position, the shift rail 52A and associated components achieve direct drive through the elements of the main transmission. It should thus be apparent that with the countershaft drive assembly 18 and specifically the air shift rail 36 and auxiliary shift rail 48 in the low range position, the shift rail 52A may be shifted at will into either available gear ratio selecting position, but that with the shift rail 52A in its forward, direct drive position, the auxiliary shift rail is locked in and locks the air shift rail 36 in its low range position.

Referring now to FIG. 6, the countershaft drive assembly 18, the air shift rail 36 and the auxiliary shift rail 48 are illustrated in their forward (leftmost), high coupling teeth 24A and 30A are now engaged in the forward position of the clutch collar 26 and the gear 20A and its associated gear on the countershaft or countershafts are now operative. In this mode of operation, it is desirable to prevent the engagement of an overdrive condition by movement of the main shift rail 52A, the associated shift fork 62A and the clutch collar 64A to the forward position. As noted, the auxiliary shift rail 48 translates positively with the air shift rail 36 and thus it, too, is in the forward, leftmost position as illustrated in FIG. 6. So positioned, the seat 80 moves out of alignment with the passageway 82 and forces the locking pin 84 into the slot 86 on the shift rail 52A. The shift rail 52A may thus move to the rear and engage the gear ratio associated with that position but it is positively prevented from moving forward and engaging overdrive. Until the air shift rail 36 and auxiliary shift rail 48 are returned to their rearward, rightmost position, i.e., low range, the main shift rail 52A may not be moved forward to engage direct drive.

It should be apparent that the instant invention is not limited to utilization with merely the transmission disclosed. Rather, a transmission utilizing greater or lesser numbers of gear reduction ratios in both its tandem drive elements may incorporate the instant invention to prohibit engagement into specific combinations of gear ratios. Multiple interlocks according to the instant invention may, of course, also be utilized within a given transmission.

Of the several advantages inherent in the instant invention, two are worthy of specific note. First of all, a transmission interlock according to the instant invention is contained wholly within the housing of the transmission. Thus, it is protected from both accidental damage and intentional tampering difficulties to which any interlock mechanism mounted external to the transmission is especially prone. Second of all, the interlock mechanism according to the instant invention is relatively simple, therefore assuring its long service life and proper operation. The simplicity minimizes not only the cost of equipping transmissions with such an interlock but also the overall weight of the transmission and encourages the use of multiple interlocks according to design requirements. By ensuring operation of the transmission only in the gear ratio combinations for which it was designed, the interlock mechanism improves the life of the transmission itself.

The foregoing disclosure is the best mode devised by the inventor for practicing this invention. It is apparent, however, that devices incorporating modifications and variations to the instant invention will be obvious to one skilled in the art of transmission mechanisms. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

The embodiments of the invention in which an exclusive property or privilege is claimed are defined as follows:

1. A gear ratio combination interlock for a vehicle transmission having at least two gear ratio selection mechanisms disposed in tandem within a unitary housing comprising, in combination, a first gear ratio selection mechanism having at least two selectively engageable gear drive ratios, first means for individually selecting said first gear drive ratios, a first shift rail operably linking said first means and said first gear ratio selection mechanism, a second gear ratio selection mechanism having at least two selectively engageable gear drive ratios, second means for individually selecting said second gear drive ratios, a second shift rail disposed generally parallel to and spaced from said first shift rail and operably linking said second means and said second gear ratio selection mechanism, an auxiliary rail disposed generally radially spaced from and parallel to said first and second shift rails, linkage means between said auxiliary rail and one of said first and second shift rails for positively compelling said auxiliary rail to move with said one of said shift rails and locking means disposed between said auxiliary rail and other of said first and second shift rails for selectively inhibiting and allowing certain combinations of positions of said shift rails.

2. The gear ratio selection interlock of claim 1, wherein said locking means includes a locking member and detent means defined by said auxiliary rail and said other of said shift rails for selectively receiving said locking member.

3. The gear ratio selection interlock of claim 2, wherein said detent means includes a slot extending axially along said shift rails and at least one circular indentation.

4. The gear ratio selection interlock of claim 2, wherein said detent means includes an annular groove disposed about said shift rails and a groove extending axially along one of said shift rails.

5. The gear ratio selection interlock of claim 2, wherein said linkage means includes an arm member extending generally perpendicularly from one of said first and second shift rails and receptacle means secured on said auxiliary shift rail for receiving said arm member.

6. The gear ratio selection interlock of claim 2, wherein said linkage means includes an arm member extending generally perpendicularly from said auxiliary shift rail and receptacle means secured on one of said first and second shift rails for receiving said arm member.

7. The interlock of claim 1 wherein said second gear drive ratio selecting means includes a pneumatic cylinder and piston operatively coupled to said second shift rail.

8. A vehicle transmission and mechanical interlock disposed within a unitary housing comprising, in combination,
   an input shaft,
   an output shaft,
   a first gear ratio selection means for effecting at least two distinct gear drive ratios between said input shaft and said output shaft,
   at least one axially translatable first shift rail associated with said first gear selection means,
   a second gear ratio selection means in tandem with said first gear ratio selection means for effecting at least two distinct gear drive ratios between said input shaft and said output shaft,
   at least one axially translatable second shift rail associated with said second gear selection means,
   an axially translatable auxiliary rail disposed generally between and parallel to said first and second shift rail,
   a linkage means between said auxiliary rail and one of said first and second shift rails for positively axially translating said auxiliary rail with said one of said rails,
   a locking member positioned transversely between said auxiliary rail and the other of said first and second shift rails, a plurality of re-entrant detents defined by said auxiliary rail and the other of said shift rails,
   whereby seating and interference of said locking member within said detents permits and precludes selection of certain combinations of gear drive ratios.

9. The mechanical transmission of claim 8, wherein said first and second shift rails are translatable between a first selecting position corresponding to a higher gear reduction ratio and a second selecting position corresponding to a lower gear reduction ratio, and said detents are disposed to preclude only mutual translation of said first and second rails into said second selecting position.

10. The mechanical transmission of claim 8, wherein said linkage means includes a radially extending arm secured to one of said first, second and auxiliary rails and an arm receiving socket structure secured to an adjacent one of said rails.

11. The transmission of claim 8, wherein said plurality of detents includes at least one slot on one of said rails having a length approximately equal to one-half the distance between said first and said second positions.

12. The transmission and interlock of claim 8 wherein said second gear ratio selection means includes a pneumatic cylinder and piston operatively coupled to said second shift rail.

13. The interlock of claim 1 or claim 8 wherein said auxiliary rail includes neither a shift yoke nor shift fork.

* * * * *